United States Patent

Mori et al.

[11] 4,120,848

[45] Oct. 17, 1978

[54] POLYURETHANE SPECTACLE FRAMES OR SINGLE PARTS THEREOF AND PROCESS FOR MAKING

[75] Inventors: Yoichi Mori; Kanichi Ueda; Masao Takahashi, all of Otsu, Japan

[73] Assignee: Toray Industries, Inc., Tokyo, Japan

[21] Appl. No.: 750,567

[22] Filed: Dec. 14, 1976

[30] Foreign Application Priority Data

Dec. 19, 1975 [JP] Japan .................................. 50/150659

[51] Int. Cl.² ...................... C08G 18/76; C08G 18/77; C08G 18/42; C08G 18/48
[52] U.S. Cl. .......................................... 528/67; 351/41; 528/273; 260/864
[58] Field of Search ................... 260/75 NT, 77.5 AT, 260/77.5 AN

[56] References Cited

U.S. PATENT DOCUMENTS

| | | | |
|---|---|---|---|
| 3,706,710 | 12/1972 | Camilleri et al. | 260/75 NT |
| 3,790,508 | 2/1974 | Triolo | 260/75 NT |
| 3,839,491 | 10/1974 | Gamero et al. | 260/77.5 AT |
| 3,925,319 | 12/1975 | Hiatt et al. | 260/77.5 AT |
| 3,997,514 | 12/1976 | Kogon | 260/77.5 AT |

FOREIGN PATENT DOCUMENTS 1,169,122 10/1969 United Kingdom.

OTHER PUBLICATIONS

Japanese Laid-Open Application 89055/1975 (Application 136,081/1973).
Saunders et al.–Polyurethanes–Part I, Interscience, N.Y. 1962, pp. 262–273.

*Primary Examiner*—H.S. Cockeram
*Attorney, Agent, or Firm*—Haseltine, Lake, & Waters

[57] ABSTRACT

Disclosed are spectacle frames or single parts thereof having a moderate heat distortion temperature, i.e. approximately 60° to approximately 70° C. The spectacle frames or single parts thereof are composed of a cured polyurethane prepared by the reaction of (1) a mixture of two types of diisocyanates represented by the following formulae (A) and (B):

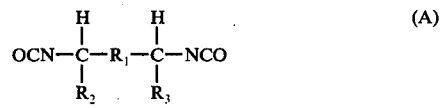

where $R_1$ is an aliphatic hydrocarbon group of 1 to 12 carbon atoms and $R_2$ and $R_3$ are hydrogen or an aliphatic hydrocarbon group of 1 to 12 carbon atoms,

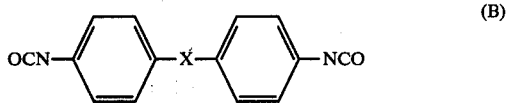

where X is oxygen or an aliphatic hydrocarbon group having 1 to 5 carbon atoms, with (2) a polyhydroxy compound having a hydroxyl value of at least 150 and an average molecular weight of 300 to 5,000. The ratio in amount of the diisocyanate of type (B) to the total of the two types of diisocyanates (A) and (B) is 0.2–0.7 by mole.

7 Claims, No Drawings

POLYURETHANE SPECTACLE FRAMES OR SINGLE PARTS THEREOF AND PROCESS FOR MAKING

This invention relates to spectacle frames or single parts thereof, composed of a cured polyurethane prepared by the reaction of a mixture of two types of diisocyanates with a polyhydroxy compound, and a process for manufacturing the same.

Spectacle frames and single parts thereof have been conveniently manufactured by casting cellulose derivatives such as celluloid, cellulose acetate and cellulose acetate butyrate. These cast articles, however, are not satisfactory because of the following drawbacks. That is, the cellulose derivatives are not sufficiently resistant to chemicals and, therefore, when a liquid cosmetic such as a hair liquid splashes thereon, the appearance of frames becomes poor. Further, the cellulose derivatives are poor in resistance to scratching and celluloid is readily combustible. In addition, since the frames contain a plasticizer, they are liable to change, for example, in flexibility during use.

To avoid the above-mentioned drawbacks, it has been proposed to use thermosetting plastic materials such as polyurethanes and epoxy resins. For example, Japanese Laid-open Patent Application No. 89055/1975 and British Pat. No. 1,169,122 disclose the use of a polyurethane prepared by the reaction of a polyisocyanate with a cycloaliphatic or another polyhydroxy compound. British Pat. Nos. 1,154,591, 1,169,121 and 1,226,488 disclose the use of various epoxy resins. However, these patents fail to teach a material of suitable heat distortion temperature, i.e. about 60° C. to about 70° C., and having enhanced hardness and favorable bending modulus. Although a material of a low heat distortion temperature is advantageous in that the insertion of glass lenses into the spectacle frames is facilitated, the spectacle frames are poor in dimensional stability and the glass lenses are liable to be separated from the spectacle frames when exposed to an elevated temperature, for example, on the dashboard of a car. On the other hand, a material of a high heat distortion temperature, i.e. above 70° C., requires high temperature upon the insertion of lenses into the spectacle frames. If a high temperature is employed upon the insertion of lenses into the spectacle frames, the spectacle frames tend to shrink when cooled to ambient temperature, and consequently, the lenses, particularly plastic lenses, are liable to be distorted.

It is a main object of the present invention to provide spectacle frames and single parts thereof, which possess moderate heat distortion temperatures, i.e. approximately 60° to approximately 70° C., and therefore, the insertion of lenses into which is easily carried out by using a conventional apparatus but the lenses inserted are not readily separated from the spectacle frames even when exposed to an elevated temperature.

Other objects and advantages of the present invention will be apparent from the following description.

In accordance with the present invention, there are provided spectacle frames or single parts thereof, composed of a cured, reaction product which is prepared by the reaction of (1) a mixture of two types of diisocyanates represented by the following formulae (A) and (B):

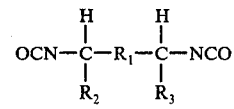

wherein $R_1$ is a divalent aliphatic hydrocarbon group having 1 to 12 carbon atoms and $R_2$ and $R_3$, which may be the same or different, are hydrogen or an aliphatic hydrocarbon group having 1 to 8 carbon atoms,

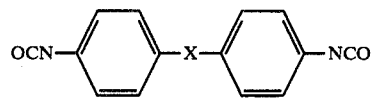

wherein X is oxygen or a divalent aliphatic hydrocarbon group having 1 to 5 carbon atoms, with (2) a polyhydroxy compound having a hydroxyl value of not less than 150 and an average molecular weight of 300 to 5,000, the ratio in amount of the diisocyanate of type (B) to the total of the two types of diisocyanates (A) and (B) being in the range of 0.2 to 0.7 by mole and the ratio in amount of the total of the two types of diisocyanates (A) and (B) to the polyhydroxy compound being such that the ratio in number of the isocyanato group (—NC0) present in the two types of diisocyanates (A) and (B) to the hydroxyl group (—OH) present in the polyhydroxy compound is in the range of 0.5 to 1.5.

The diisocyanate of type (A) used in the invention includes, for example, tetramethylene diisocyanate, pentamethylene diisocyanate, hexamethylene diisocyanate, 1-methylhexamethylene diisocyanate, 2,2,4-trimethylhexamethylene diisocyanate and 2,4,4-trimethylhexamethylene diisocyanate. The diisocyanate of type (B) used in the invention includes, for example, 4,4'-diphenylmethane diisocyanate, 4,4'-diphenylisopropylidene diisocyanate and 4,4'-diphenylether diisocyanate.

The proportion of the two types of diisocyanates (A) and (B) should be such that the ratio of type (B) to the total of types (A) and (B) is in the range of 0.2 to 0.7 by mole, for the purpose of providing the desired spectacle frames having a heat distortion temperature of approximately 60° C. to approximately 70° C. When the ratio of type (B) to the total of types (A) and (B) is smaller than the above-mentioned range, the polyurethane material obtained has a lower heat distortion temperature. In contrast when said ratio is larger than the above-mentioned range, the polyurethane has a higher heat distortion temperature.

The polyhydroxy compound used in the invention has more than 2.0 in average of hydroxyl groups in the molecule, a hydroxyl value of not less than 150 and an average molecular weight of 300 to 5,000. A preferable hydroxyl value is in the range of 150 to 1,300. With a hydroxyl value of less than 150 the polyurethane material obtained becomes rubber-like.

A suitable polyhydroxy compound is a polyesterpolyol, i.e. a compound which contains ester bonds in the main chain and at least two hydroxyl groups in the molecule. The polyesterpolyol is preferably a reaction product of excessive moles of a low molecular weight polyol with a dibasic acid such as succinic acid, glutaric acid, adipic acid, sebacic acid, phthalic acid and isophthalic acid, or a polymerization product of excess moles of a lactone with a low molecular weight polyol. The low molecular weight polyol used for the preparation of the polyesterpolyol includes, for example, a diol such as ethylene glycol, 1,2- or 1,3-propylene glycol, 1,3- or 1,4-butanediol, hexanediol, diethylene glycol, triethylene glycol, dipropylene glycol, tripropylene glycol or bisphenol A; a triol such as glycerin, trimethylolethane or trimethylolpropane; a tetrol such as pentaerythritol; or a hexitol such as sorbitol or mannitol. These polyols may be used alone or in combination.

Another suitable polyhydroxy compound is a polyetherpolyol, i.e. a compound which contains ether bonds in the main chain and at least two hydroxyl group in the molecule. The polyetherpolyol is preferably an addition product of a low molecular weight polyol with ethylene oxide or propylene oxide. The low molecular weight polyol used may be similar to those which are used for the preparation of the above-mentioned polyesterpolyol.

The polyurethane material of the invention is prepared as follows. First, the above-mentioned two types of diisocyanates (A) and (B) and polyhydroxy compound are blended with each other in the absence of a solvent, and if desired heated usually at 40° to 70° C., thereby to form a homogeneous solution. The proportion of the two types of diisocyanates (A) and (B) to the polyhydroxy compound should be such that the ratio in number of the isocyanato group (—NCO) present in the two types of diisocyanates to the hydroxyl group (—OH) present in the polyhydroxy compound is in the range of 0.5 to 1.5, for the purpose of providing a polyurethane of the desired molecular weight. The optimum ratio is approximately 1.

The polymerizable blend in the form of a homogeneous solution is deaerated in a conventional manner and, then, before becoming gel, i.e. while the solution is still sufficiently fluid, the solution is charged into a mold for a spectacle frame or a single part thereof. The polymerizable blend is maintained in the mold at a temperature of 10° to 200° C., preferably 40° to 150° C., to form a cured polyurethane product.

Suitable additives may be added to the polymerizable blend. For example, a minor amount of a polymerization catalyst such as zinc naphthenate, dibutyltin dilaurate and triethylamine may be added to shorter the polymerization period.

The spectacle frames and single parts thereof of the present invention possess the following properties.

(1) Moderate heat distortion temperatures, i.e. approximately 60° to approximately 70° C. Therefore, glass lenses can be easily inserted into the spectacle frames by using a conventional apparatus, and the glass lenses inserted are not readily separated from the spectacle frames.

(2) Relatively low specific gravity, i.e. approximately 1.2, and not weighty. This is lower than the specific gravity of conventional celluloid (1.4) and cellulose acetate (1.3).

(3) Moderate flexibility. The spectacle fits well to the face.

(4) Good transparency.
(5) Good luster.
(6) Good resistance to scratching and chemicals.
(7) Non-combustibility.
(8) Good impact resistance.

The invention is further illustrated by the Examples set forth below. In the Examples, hardness means indentation hardness determined by using Type D Durometer according to a method similar to ASTM D 2240-68. The heat distortion temperature was determined as follows. A specimen in the form of sheet having a 10mm × 10mm × 3mm size was prepared from the cured polyurethane. An indentor having a cross-sectional area of 1 mm$^2$ with a load of 1 kg was forced into the specimen while the temperature was elevated at a rate of 2° C./min. The depths of penetration were measured to draw a curve showing the relationship between the depths of penetration in mm (ordinate) and the temperature in ° C. (abscissa). The point on the abscissa at which the tangent line passing the inflection point of the drawn curve intersects the abscissa was taken as the heat distortion temperature. The bending modulus was determined according to a method similar to ASTM D-790-66.

EXAMPLE 1

12.1 g of hexamethylene diisocyanate, 12.0 g of 4,4'-methylenebis(phenylisocyanate) (the amount of 4,4'-methylenebis(phenylisocyanate) is 0.4 mole per mole of the total of these two diisocyanates) and 46.0 g of a polyesterpolyol, having a hydroxyl value of 291 and a molecular weight of approximately 900 (trade name SANESTER No. 80, a reaction product of adipic acid, phthalic acid, 1,3-butanediol and trimethylolpropane, supplied by SANYO KASEI CO.), were mixed, and then, deaerated at 60° C. Immediately thereafter, the deaerated mixture was charged into molds for spectacle frames, previously coated with a releasing agent, and then, heated in the molds at 80° C. for five hours. After being cooled, spectacle frames were removed. The spectacle frames were homogeneous and free from imperfections. Flashes were removed therefrom and the spectacle frames were polished to obtain colorless, transparent and lustrous spectacle frames. The spectacle frames obtained had a hardness of 82, a heat distortion temperature of 64.0° C., a bending modulus of 21,200 kg/cm$^2$ and a specific gravity of 1.18, which was lighter than that of celluloid, i.e. 1.40. No change could be observed when the spectacle frames were placed in a hair liquid VITALIS (trade mark, supplied by The Lion Dentifrice Co.) at room temperature for two days. In contrast, conventional celluloid spectacle frames became spotted merely when the same hair liquid was splashed thereon.

EXAMPLE 2

Following the general procedure set forth in Example 1, spectacle frames were manufactured from a mixture consisting of 18.0 g of trimethylhexamethylene diisocyanate (a 2,2,4- and 2,4,4- mixture), 9.2 g of 4,4'-methylenebis(phenylisocyanate) (the amount of the latter diisocyanate was 0.30 mole per mole of the total of these two diisocyanates) and 32.0 g of an octa functional polyetherpolyol (polypropylene oxide-added sucrose) having a hydroxyl value of 430 and a molecular weight of 1,050. The mixing of the three compounds was carried out at 50° C.

The spectacle frames obtained had a hardness of 82, a heat distortion temperature of 63.5° C., a bending modulus of 22,300 kg/cm$^2$ and a specific gravity of 1.18.

EXAMPLE 3

Following the general procedure set forth in Example 1, spectacle frames were manufactured from a mixture of 16.6 g of hexamethylene diisocyanate, 6.2 g of 4,4'-diphenylether diisocyanate (the amount of the latter diisocyanate was 0.20 mole per mole of the total of these two diisocyanates) and 46.1 g of a polyesterpolyol (a reaction product of adipic acid, phthalic acid, ethylene glycol and trimethylolpropane) having a hydroxyl value of 300 and a molecular weight of 850.

The spectacle frames obtained had a hardness of 82, a heat distortion temperature of 60.0° C., a bending modulus of 21,000 kg/cm$^2$ and a specific gravity of 1.18.

COMPARATIVE EXAMPLE 1

Following the general procedure set forth in Example 1, spectacle frames were manufactured wherein 4,4'-methylenebis(phenylisocyanate) was not used. The spectacle frames obtained had a hardness of 80, a heat distortion temperature of 43.0° C., a bending modulus of 12,500 kg/cm$^2$ and a specific gravity of 1.20.

COMPARATIVE EXAMPLE 2

Following the general procedure set forth in Example 1, spectacle frames were manufactured wherein the amount of 4,4'-methylenebis(phenylisocyanate) was varied to 0.8 mole per mole of the total of the two types of diisocyanates used. The spectacle frames obtained had a hardness of 82, a heat distortion temperature of 80° C., a bending modulus of 26,000 kg/cm$^2$ and a specific gravity of 1.18.

EXAMPLE 4

Following the general procedure set forth in Example 1, spectacle frames were manufactured from a mixture consisting of 18.2 g of hexamethylene diisocyanate, 18.1 g of 4,4'-methylenebis(phenylisocyanate) (the amount of the latter diisocyanate was 0.40 mole per mole of the total of these two diisocyanates), and 70.0 g of a polyesterpolyol having a hydroxyl value of 290 and a molecular weight of approximately 800 (trade name, Desmophen 800, supplied by Bayer A.G., a reaction product of phthalic acid, adipic acid and trimethylolpropane). The spectacle frames obtained had a hardness of 81, a heat distortion temperature of 69.0° C., a bending modulus of 19,500 kg/cm$^2$ and a specific gravity of 1.18.

EXAMPLE 5

Following the general procedure set forth in Example 1, spectacle frames were manufactured from a mixture consisting of 15.0 g of hexamethylene diisocyanate, 22.3 g of 4,4'-methylenebis(phenylisocyanate) (the amount of the latter diisocyanate was 0.50 mole per mole of the total of these two diisocyanates) and 68.8 g of a polyesterpolyol similar to that used in Example 1. The spectacle frames obtained had a hardness of 81, a heat distortion temperature of 68.0° C., a bending modulus of 22,200 kg/cm$^2$ and a specific gravity of 1.18.

EXAMPLE 6

Following the general procedure set forth in Example 1, spectacle frames were manufactured from a mixture consisting of 12.1 g of hexamethylene diisocyanate, 20.0 g of 4,4'-isopropylidenebis(phenylisocyanate) (the amount of the latter diisocyanate was 0.5 mole per mole of the total of these two diisocyanates) and 55.4 g of a polyesterpolyol similar to that used in Example 1. The spectacle frames obtained had a hardness of 81, a heat distortion temperature of 67.0° C., a bending modulus of 23,500 kg/cm$^2$ and a specific gravity of 1.20.

COMPARATIVE EXAMPLE 3

Following the general procedure set forth in Example 1, spectacle frames were manufactured from a mixture consisting of 10.5 g of hexamethylene diisocyanate, 5.9 g of isophorone diisocyanate (the amount of the latter diisocyanate was 0.3 mole per mole of the total of these two diisocyanates) and 34.3 g of a polyesterpolyol similar to that used in Example 1. The spectacle frames obtained had a hardness of 85, a heat distortion temperature of 53° C., a bending modulus of 23,000 kg/cm$^2$ and a specific gravity of 1.18.

COMPARATIVE EXAMPLE 4

Following the general procedure set forth in Example 1, spectacle frames were manufactured from a mixture consisting of 31.8 g of hexamethylene diisocyanate, 5.3 g of 4,4'-methylenebis(phenylisocyanate) (the amount of the latter diisocyanate was 0.1 mole per mole of the total of these two diisocyanates) and 81.0 g of a polyester polyol similar to that used in Example 1. The spectacle frames obtained had a hardness of 82, a heat distortion temperature of 50.5° C., a bending modulus of 19,500 kg/cm$^2$ and a specific gravity of 1.18.

COMPARATIVE EXAMPLE 5

Following the general procedure set forth in Example 1, spectacle frames were manufactured from a mixture consisting of 2.6 g of hexamethylene diisocyanate, 34.1 g of 4,4'-methylenebis(phenylisocyanate) (the amount of the latter diisocyanate was 0.9 mole per mole of the total of these two diisocyanates) and 58.4 g of a polyesterpolyol similar to that used in Example 1. The spectacle frames obtained had a hardness of 82, a heat distortion temperature of 86.5° C., a bending modulus of 27,000 and a specific gravity of 1.20.

COMPARATIVE EXAMPLE 6

Following the general procedure set forth in Example 1, spectacle frames were manufactured from a mixture consisting of 5.0 g of hexamethylene diisocyanate, 7.4 g of 4,4'-methylenebis(phenylisocyanate) (the amount of the latter diisocyanate was 0.5 mole per mole of the total of these two diisocyanates), and 118.6 g of polyethylene adipate having a hydroxyl value of 56 and a molecular weight of approximately 2,000. The spectacle frames were rubber-like and of no practical value.

COMPARATIVE EXAMPLE 7

Following the general procedure set forth in Example 1, spectacle frames were manufactured from a mixture consisting of 9.8 g of hexamethylene diisocyanate, 6.6 g of 4,4'-methylenebis(cyclohexylisocyanate) (the amount of the latter diisocyanate was 0.3 mole per mole of the total of these two diisocyanates) and 32.1 g of a polyesterpolyol similar to that used in Example 1. The spectacle frames obtained had a hardness of 81, a heat distortion temperature of 50.0° C., a bending strength of 19,100 kg/cm$^2$ and a specific gravity of 1.18.

COMPARATIVE EXAMPLE 8

Following the general procedure set forth in Example 1, spectacle frames were manufactured from a mixture consisting of 36.0 g of lysinediisocyanate methyl ester, and 52.4 g of a polyesterpolyol having a hydroxyl value of 360 and a molecular weight of 800 (a reaction product of adipic acid, phthalic anhydride and trimethylol propane). The spectacle frames obtained had a hardness of 83, a heat distortion temperature of 49.0° C., a bending modulus of 22,900 kg/cm$^2$ and a specific gravity of 1.20.

What we claim is:

1. Spectacle frames or single parts thereof, having a heat distortion temperature of about 60° to about 70° C., a bending modulus of 19,500 to 23,500 kg/cm² and a hardness of 81 to 82, composed of a cured, reaction product which is prepared by the reaction of (1) a mixture of two types of diisocyanates represented by the following formulae (A) and (B):

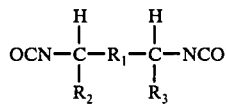

wherein $R_1$ is a divalent aliphatic hydrocarbon group having 1 to 12 carbon atoms and $R_2$ and $R_3$, which may be the same or different, are hydrogen or an aliphatic hydrocarbon group having 1 to 8 carbon atoms,

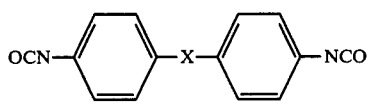

wherein X is oxygen or a divalent aliphatic hydrocarbon group having 1 to 5 carbon atoms, with (2) a polyhydroxy compound having a hydroxyl value of 150 to 1,300, more than 2.0, on average, hydroxyl groups in the molecule and an average molecular weight of 300 to 5,000, the ratio in amount of the diisocyanate of type (b) to the total of the two types of diisocyanates (A) and (B) being in the range of 0.2 to 0.7 by mole and the ratio in amount of the total of the two types of diisocyanates (A) AND (B) to the polyhydroxy compound being such that the ratio in number of the isocyanato group (—NCO) present in the two types of diisocyanates (A) and (B) to the hydroxyl group (—OH) present in the polyhydroxy compound is in the range of 0.5 to 1.5.

2. Spectacle frames or single parts thereof according to claim 1 wherein the polyhydroxy compound is at least one compound selected from the group consisting of a polyesterpolyol and a polyetherpolyol.

3. Spectacle frames or single parts thereof according to claim 2 wherein the polyesterpolyol is at least one compound selected from the group consisting of (1) a reaction product of at least one low molecular weight polyol with a dibasic acid, the amounts of the polyol and the dibasic acid being such that the hydroxyl groups present in the polyol are larger in number than the carboxyl groups present in the dibasic acid, and (2) a polymerization product of a low molecular weight polyol and a lactone.

4. Spectacle frames or single parts thereof according to claim 2 wherein the polyetherpolyol is an addition product of a low molecular weight polyol with ethylene oxide or propylene oxide.

5. Spectacle frames or single parts thereof according to claim 1 wherein the diisocyanate of type (A) is at least one compound selected from the group consisting of tetramethylene diisocyanate, pentamethylene diisocyanate, hexamethylene diisocyanate and trimethylhexamethylene diisocyanate.

6. Spectacle frames or single parts thereof according to claim 1 wherein the diisocyanate of type (B) is at least one compound selected from the group consisting of 4,4'-diphenylmethane diisocyanate, 4,4'-diphenylisopropylidene diisocyanate and 4,4'-diphenylether diisocyanate.

7. A process of manufacturing spectacle frames or single parts thereof, having a heat distortion temperature of about 60° to about 70° C., a bending modulus of 19,500 to 23,500 kg/cm² and a hardness of 81 to 82, comprising the steps of:

charging into a mold a blend of homogeneous solution form which is comprised of (1) a mixture of two types of diisocyanates represented by the following formulae (A) and (B):

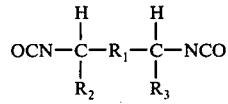

wherein $R_1$ is a divalent aliphatic hydrocarbon group having 1 to 12 carbon atoms and $R_2$ and $R_3$, which may be same or different, are hydrogen or an aliphatic hydrocarbon group having 1 to 8 carbon atoms,

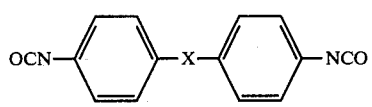

wherein X is a divalent aliphatic hydrocarbon group having 1 to 5 carbon atoms or oxygen, and (2) a polyhydroxy compound having a hydroxyl value of 150 to 1,300, more than 2.0, on average, hydroxyl groups in the molecule and an average molecular weight of 300 to 5,000, the ratio in amount of the diisocyanate of type (B) to the total of the two types of diisocyanates (A) and (B) being in the range of 0.2 to 0.7 by mole and the ratio in amount of the total of the two types of diisocyanates (A) and (B) to the polyhydroxy compound being such that the ratio in number of the isocyanato group (—NCO) present in the two types of diisocyanates (A) and (B) to the hydroxyl group (—OH) present in the polyhydroxy compound is in the range of 0.5 to 1.5, and then, maintaining said blend at a temperature of 10° to 200° C., thereby permitting the blend to cure.

* * * * *